United States Patent
Kano et al.

(10) Patent No.: US 11,807,316 B2
(45) Date of Patent: Nov. 7, 2023

(54) POWER STEERING APPARATUS

(71) Applicant: DENSO CORPORATION, Kariya (JP)

(72) Inventors: Ryo Kano, Kariya (JP); Daisuke Kobayashi, Kariya (JP); Takashi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 802 days.

(21) Appl. No.: 16/559,946

(22) Filed: Sep. 4, 2019

(65) Prior Publication Data

US 2020/0079421 A1 Mar. 12, 2020

(30) Foreign Application Priority Data

Sep. 6, 2018 (JP) .................. 2018-167319

(51) Int. Cl.
| | | |
|---|---|---|
| B62D 5/04 | (2006.01) | |
| B62D 1/20 | (2006.01) | |
| B62D 15/02 | (2006.01) | |
| B62D 3/12 | (2006.01) | |

(52) U.S. Cl.
CPC ............ *B62D 5/0484* (2013.01); *B62D 1/20* (2013.01); *B62D 3/126* (2013.01); *B62D 5/0412* (2013.01); *B62D 5/0463* (2013.01); *B62D 15/0235* (2013.01)

(58) Field of Classification Search
CPC ................................................ B60W 60/005
USPC ....................................................... 701/42
See application file for complete search history.

(56) References Cited

U.S. PATENT DOCUMENTS

| | | | | |
|---|---|---|---|---|
| 9,580,080 | B1* | 2/2017 | Letwin ................ | B60W 50/082 |
| 2003/0234135 | A1* | 12/2003 | Gaunt ..................... | B62D 5/07 |
| | | | | 180/417 |
| 2006/0282565 | A1* | 12/2006 | Kumaido ............. | B62D 5/0493 |
| | | | | 710/41 |
| 2008/0042613 | A1* | 2/2008 | Aizawa .................. | H02P 21/34 |
| | | | | 318/778 |
| 2010/0042295 | A1 | 2/2010 | Shibata et al. | |
| 2018/0237058 | A1* | 8/2018 | Furukawa ............... | H02P 29/02 |
| 2019/0111969 | A1* | 4/2019 | Pramod ................ | B62D 5/0487 |

FOREIGN PATENT DOCUMENTS

| | | |
|---|---|---|
| JP | 2004-82798 A | 3/2004 |
| JP | 5168882 B2 | 3/2013 |

* cited by examiner

*Primary Examiner* — Maceeh Anwari
(74) *Attorney, Agent, or Firm* — MASCHOFF BRENNAN

(57) ABSTRACT

A power steering apparatus has a first actuator provided as a multi-phase rotating electric machine and disposed on a steering column side of an intermediate shaft and a second actuator disposed on a rack gear side thereof. A first ECU controls a drive of the first actuator and detects an abnormality of the first actuator. The first ECU changes an output of the first actuator based on a notification from a communication bus. The first ECU performs an initial diagnosis of the first actuator at a vehicle startup time for detecting abnormality, by supplying an electric power to the first actuator for not providing a torque to a steering wheel.

17 Claims, 9 Drawing Sheets

POWER STEERING APPARATUS

CROSS REFERENCE TO RELATED APPLICATION

The present application is based on and claims the benefit of priority of Japanese Patent Application No. 2018-167319, filed on Sep. 6, 2018, the disclosure of which is incorporated herein by reference.

TECHNICAL FIELD

The present disclosure generally relates to a power steering apparatus.

BACKGROUND INFORMATION

In the related art, a power steering apparatus that assists a steering operation of a driver, having a plurality of actuators, is known.

For example, in an electric power steering apparatus one of the two electric motors may be disposed on a steering column and the other may be disposed on a rack shaft.

In normal operation, only one of the two actuators, i.e., a main actuator, is used and the other one, i.e., a sub-actuator, is used under special circumstances. Here, the sub-actuator may be a motor, and the main actuator may be a hydraulic actuator or a motor. In such a configuration, since the sub-actuator is not used in a normal operation time, it may not be possible to perform an initial diagnosis of the sub-actuator since the sub-actuator is not supplied with power.

SUMMARY

It is an object of the present invention to provide a power steering apparatus having a plurality of actuators that are capable of performing an initial diagnosis, even for normally-non-driven actuator(s), for detecting the abnormality of such actuators.

In an exemplary embodiment of the power steering apparatus of the present invention, a steering torque applied to a steering wheel is transmitted from a steering shaft included in a steering column via an intermediate shaft and a rack gear to a tire, to which a steering assist torque is output and applied.

The power steering apparatus includes a first actuator, a second actuator, a controller, and a vehicle communication bus. The first actuator is constituted by a multi-phase rotating electric machine, and is disposed on the steering column side with respect to the intermediate shaft, and is operable to output the steering assist torque. The second actuator is disposed on the rack gear side with respect to the intermediate shaft, and is operable to output the steering assist torque.

The controller controls a drive of the first actuator and can detect an abnormality of the first actuator. Note that, in a configuration further including a "second controller" for controlling a drive of the second actuator, the "controller" described above may be considered as a "first controller." The controller is connected to the vehicle communication bus.

The controller changes the output of the first actuator based on a notification from the communication bus. Further, in the initial diagnosis of the first actuator at a vehicle startup time, the controller energizes the first actuator so as not to provide any torque to the steering wheel to diagnose the abnormality of the first actuator.

In a case where the first actuator is not substantially driven in a normal operation time by not being energized, an opportunity of performing the initial diagnosis of normal or abnormal of the first actuator cannot be obtained. Further, the energization of the first actuator solely for the initial diagnosis, irrespective of the drive in the normal operation time, may lead to an unintentional rotation of the steering wheel, i.e., against the intention of the driver. Therefore, in the present disclosure, for performing the initial diagnosis, the first actuator is energized in a manner that does not apply any torque to the steering wheel, thereby enabling the initial diagnosis of abnormality that is not detectable without the energization, without causing any discomfort for the driver, i.e., without causing any unintentional move of the steering wheel. Further, when an abnormality is detected by such diagnosis, an appropriate abnormality handling process is performable, for the improved reliability of the system.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Exemplary Embodiment

Hereinafter, a power steering apparatus according to an exemplary embodiment of the present invention is described with reference to the drawings. The power steering apparatus of the present embodiment is an apparatus that outputs a steering assist torque in a steering system of a vehicle. The apparatus in the present embodiment is assumed as being disposed on a vehicle having an automatic driving (i.e., auto-drive) function such as, for example, auto-parking, lane keeping, and/or adaptive cruise control for following a lead vehicle, and automatic avoidance of other/surrounding vehicles and obstacles.

In the specification of the present disclosure, "steering assist" means not only outputting a torque to assist the driver in a manual drive mode, but also outputting a steering torque according to an instruction of an auto-drive mode. That is, in other words, the apparatus is considered as outputting the steering assist torque in the auto-drive mode, even when the driver is not "driving," i.e., is not performing a steering operation and no steering toque is applied to the steering wheel (i.e., when the steering torque is equal to zero).

Figure 1:
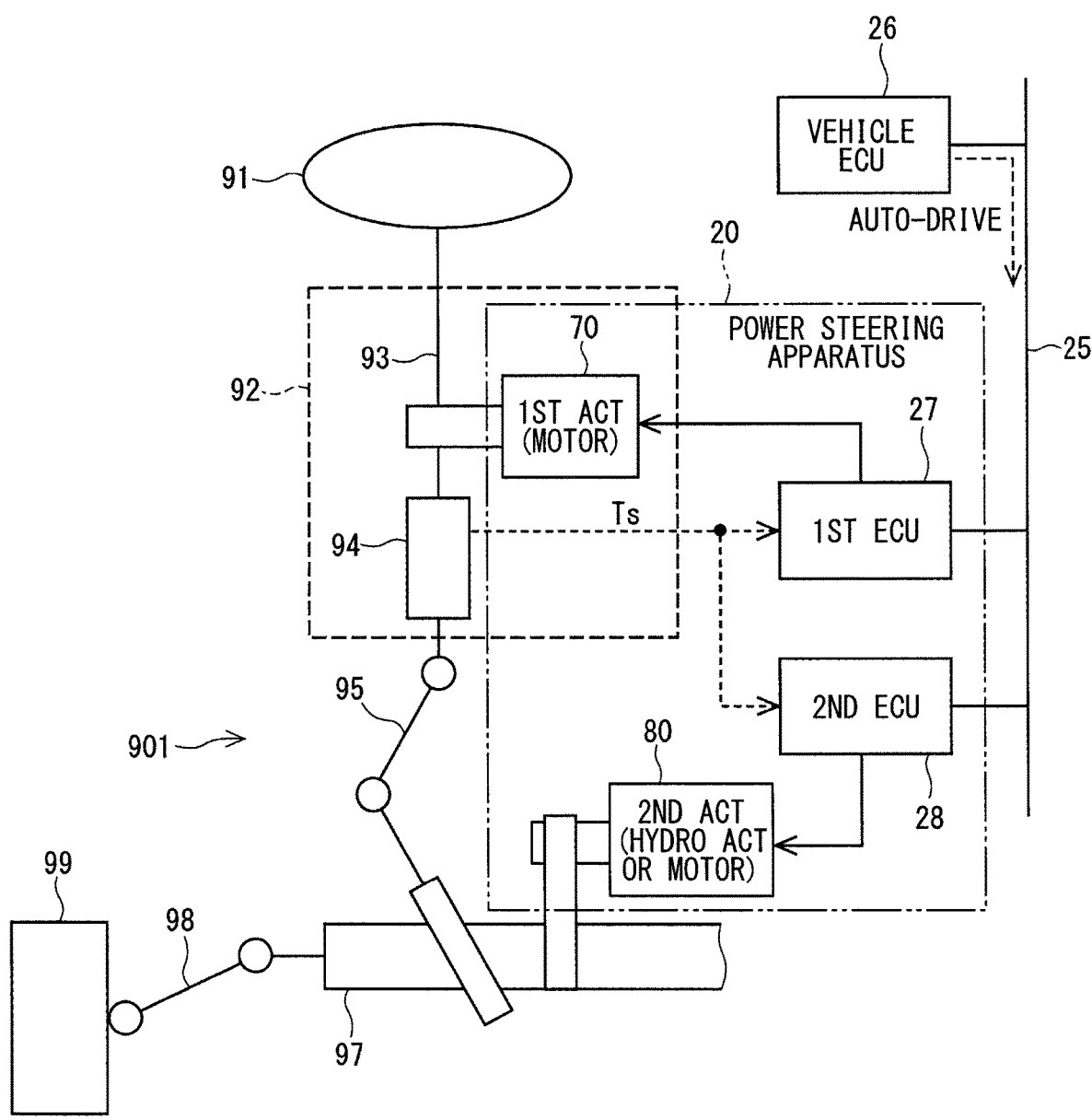
FIG. 1 is a block diagram of a steering system to which a power steering apparatus according to an embodiment of the present disclosure is applied.

As shown in FIG. 1, a steering system 901 includes a steering wheel 91, a steering shaft 93, an intermediate shaft 95, a rack gear 97, and the like. The steering shaft 93 is included in, or covered by a steering column 92, and one end of the steering shaft 93 is connected to the steering wheel 91, and the other end thereof is connected to the intermediate shaft 95. A torque sensor 94 for detecting a steering torque Ts based on a torsion angle of a torsion bar is provided at a middle position of the steering shaft 93.

At one end of the intermediate shaft 95 opposite to the steering wheel 91, the rack gear 97 is provided for converting rotation into reciprocal motion by a rack and pinion mechanism and transmitting the reciprocal motion. When the rack gear 97 moves back and forth, the tire 99 is steered through a knuckle arm 98. In FIG. 1, only one tire 99 is shown, and the opposite tire is omitted from the drawing.

The steering system 901 is provided with two actuators 70 and 80 that can output the steering assist torque. The first actuator 70 is provided near the steering column 92, and the second actuator 80 is provided near the rack gear 97. When the intermediate shaft 95 is defined as a reference, the first actuator 70 is provided on one side, i.e., a steering column 92 side, of the intermediate shaft 95. Further, the second actuator 80 is provided on the other side of the intermediate shaft 95, i.e., on a rack gear 97 side thereof.

The second actuator 80 is provided as a hydraulic actuator or, in other embodiments as a multi-phase rotating electric machine, and is capable of transmitting a relatively-large output to the rack gear 97. For example, in a configuration in which the second actuator 80 is a hydraulic cylinder and the output of a linear motion is directly transmitted as a linear motion of the rack gear 97, the second actuator 80 itself does not output a torque in a rotation direction. However, even in such a configuration, it may be considered that the second actuator 80 outputs a torque of the steering shaft 93 which is inversely calculable from a rack axial force. Further, when the second actuator 80 is a multi-phase rotating electric machine, the number of sets of winding and the type of rotating electric machine are arbitrarily set.

A second ECU 28 serving as a "second controller" controls a drive of the second actuator 80, and is capable of detecting abnormality of the second actuator 80. For example, when the second actuator 80 is a hydraulic type actuator, the second ECU 28 controls a hydraulic control valve to adjust a pressure and an operation speed. In the configuration of using a hydraulic actuator as the second actuator 80, it is possible to obtain a high output with a relatively inexpensive actuator. In the configuration of using the hydraulic actuator, it is also possible to open/close the valve by utilizing a twist of the torsion bar, which may be realized as a less expensive configuration from which the second ECU 28 is dispensable.

When the second actuator 80 is a multi-phase rotating electric machine, the second ECU 28 controls a drive of the second actuator 80 by general motor control. As described later, since the first actuator 70 is a multi-phase rotating electric machine, matching of control between the second actuator 80 and the first actuator 70 may be facilitated in terms of control by using electric power (i.e., current/voltage).

In the present embodiment, the first actuator 70 is provided as a multi-phase rotating electric machine arranged in the steering column 92. The output of the first actuator 70 is transmitted to the steering shaft 93 via a speed reduction gear. However, since the output of the first actuator 70 is smaller than the output of the second actuator 80, the second actuator 80 serves as a main actuator and the first actuator 70 serves as a sub-actuator. The first ECU 27 serving as a "controller" or a "first controller" controls a drive of the first actuator 70, and is capable of detecting abnormality of the first actuator 70.

Figure 2:
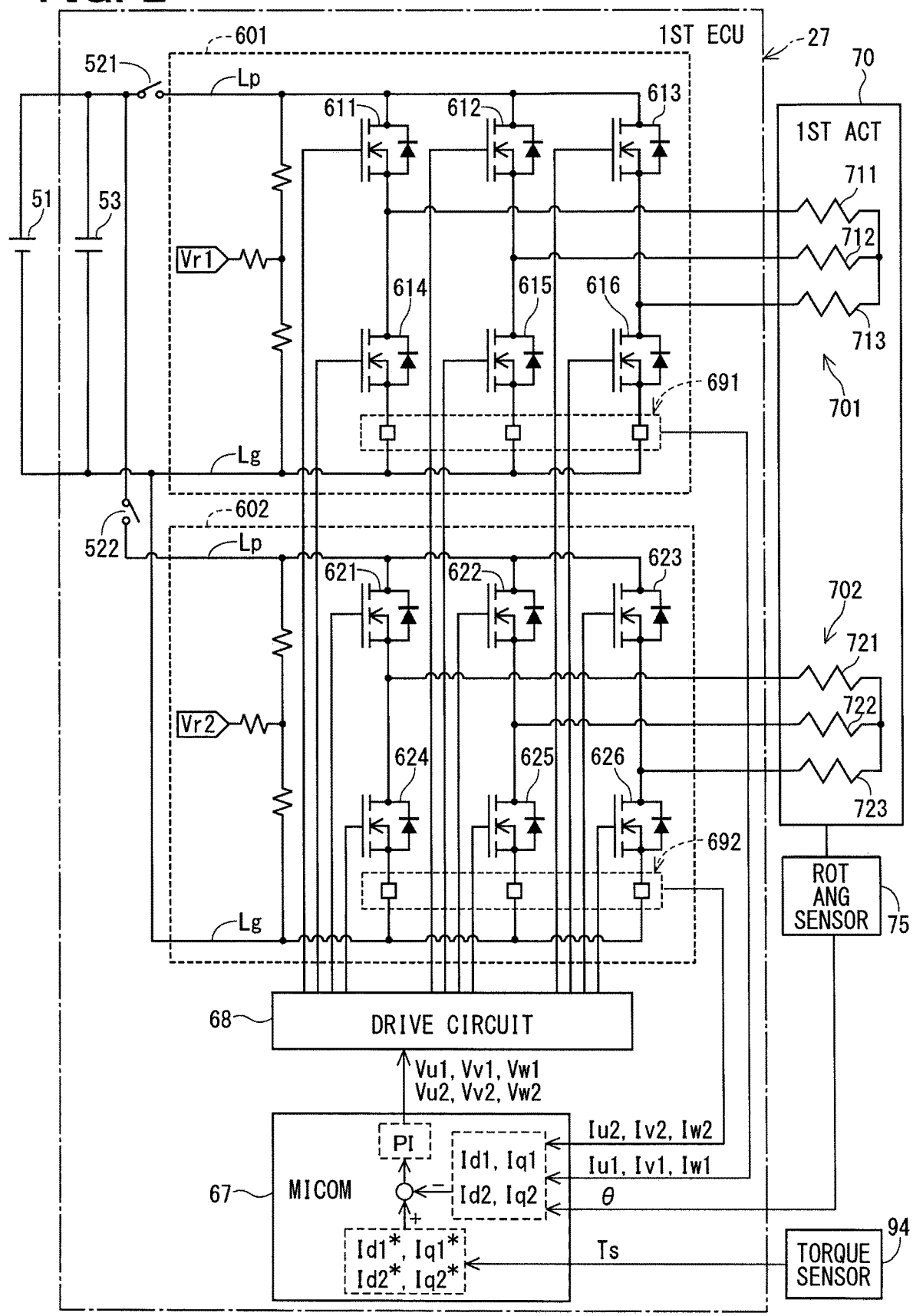
FIG. 2 is a configuration diagram of a first actuator and a first ECU.

FIG. 2 shows an overall configuration of the first actuator 70 and the first ECU 27. The first actuator 70 of the present embodiment is a three-phase brushless motor having two sets of three-phase winding 701, 702. Each of phase coils 721, 722, 723 of the second winding 702 are arranged in a positional relationship of, for example, an electric angle of 30 deg with respect to each of phase coils 711, 712, 713 of the first winding 701. A rotation angle sensor 75 detects an electric angle $\theta$ of the first actuator 70.

The first ECU 27 includes inverters 601 and 602, a microcomputer 67, a drive circuit 68, current sensors 691 and 692, and the like. The first inverter 601 and the second inverter 602 are provided corresponding to the two sets of windings 701 and 702, for example, and respectively output an alternating current to the two sets of windings 701 and 702 with a phase difference of $(30\pm60\times n)$ [deg] ("n" is an integer).

Hereinafter, a unit including a winding and an inverter corresponding to the winding is referred to as a "system." The numbers "1" and "2" in the third digit of a component sign and the numerals "1" and "2" at the end of a sign representing physical quantities such as current and voltage are the suffixes indicating that the physical quantities belong to the first system or the second system. When describing the physical quantities of two systems in a collective manner, the suffixes, i.e., the numbers "1" and "2," are dropped. As described above, the first actuator 70 is a multi-phase rotating electric machine of two systems driven by electric power supplied to the two sets of windings 701, 702.

In the inverters 601 and 602, six switching elements 611 to 616, 621 to 626 such as MOSFETs, for example, are bridge-connected to positions between a high potential line Lp and a low potential line Lg. Power supply relays 521, 522 for respective systems and a smoothing capacitor 53 are provided at an input portion of the inverters 601 and 602. Further, by detecting divided voltages Vr1 and Vr2, it is possible to detect an input voltage of the inverters 601, 602.

The microcomputer 67 calculates dq axis current instruction values Id1*, Iq1*, Id2*, Iq2* of the respective systems based on the steering torque Ts detected by the torque sensor 94. Further, phase currents Iu1, Iv1, Iw1, Iu2, Iv2, Iw2 of the respective systems detected by the current sensors 691, 692 are converted to dq axis currents Id1, Iq1, Id2, Iq2 by using the electric angle $\theta$ detected by a rotation angle sensor 75. The dq axis currents Id1, Iq1, Id2, Iq2 are fed back to the current instruction values Id1*, Iq1*, Id2*, Iq2*, and a dq axis voltage instruction value is calculated by the PI control for minimizing, i.e., zeroing, a deviation between the feedbacks of the dq axis currents and the current instruction values. The dq axis voltage instruction value is coordinate-converted to three-phase voltage instruction values Vu1, Vv1, Vw1, Vu2, Vv2, Vw2, and are output to the drive circuit 68.

Based on the three-phase voltage instruction values Vu1, Vv1, Vw1, Vu2, Vv2, Vw2, the drive circuit 68 instructs drive signals to the switching elements 611-616, 621-626 of the inverters 601, 602. The inverters 601 and 602 convert a direct current (DC) power of a battery 51 by performing switching operation according to the drive signal from the drive circuit 68, and supply the DC power to the two sets of winding 701 and 702.

Returning to FIG. 1, the first ECU 27 and the second ECU 28 are connected to a Controller Area Network (CAN) bus 25 serving as a "communication bus" that is a vehicle-mounted communication network. The first ECU 27 changes the output of the first actuator 70 based on a notification from the CAN bus 25. Further, in the present embodiment, the first ECU 27 and the second ECU 28 can mutually exchange drive information and abnormality information of the first actuator 70 and the second actuator 80. For example, when the first ECU 27 detects abnormality of the first actuator 70 or when the second ECU 28 detects abnormality of the second actuator 80, an abnormality flag is transmitted to the CAN bus 25.

Hereinafter, a situation in which both of the first actuator 70 and the second actuator 80 are normal (i.e., normally operating) in the manual drive mode is referred to as a "normal operation time." In a steering assist control of the normal operation time, the second actuator 80 outputs the steering assist torque, for controlling the output of the first actuator 70 to be substantially equal to zero. Here, "the output is substantially equal to 0" is not limited to a case that the output of the first actuator 70 is strictly equal to 0, but may also mean that the output of the first actuator 70 is extremely small with respect to the output of the second actuator 80 or the like.

Further, in the present embodiment, when an execution condition of an auto-drive is satisfied, the vehicle ECU 26 serving as a "vehicle controller" instructs the power steering apparatus 20 to execute the function of steering the tire 99. That is, the vehicle ECU 26 instructs the first ECU 27 and the second ECU 28 to output the steering assist torque in the auto-drive mode via the CAN bus 25. When both of the first actuator 70 and the second actuator 80 are normal, the first ECU 27 and the second ECU 28 control, for the drive of the vehicle, the first actuator 70 and the second actuator 80 to cooperatively output the steering assist torque in the auto-drive mode.

Based on the above, in an in-vehicle system with a high safety requirement, it is expected to improve the system reliability by performing an initial diagnosis of the actuator at the system startup time and by performing an abnormality handling process upon detecting abnormality including a system stop. In terms of providing an opportunity for performing an initial diagnosis of the second actuator 80, which is a main actuator, the diagnosis opportunity is sufficient. On the other hand, for the first actuator 70, which is not substantially driven in the normal operation time, an opportunity for performing the initial diagnosis may be insufficient for the diagnosis items other than the items that are examinable/diagnosable without supplying electric power (i.e., without energization).

Further, if the first actuator 70 is energized only for the initial diagnosis irrespective of the drive in the normal operation time, the steering wheel 91 may rotate against the intention of the driver. Therefore, regarding the first actuator 70 which is not usually driven in the normal operation time, it is an object of the present embodiment to perform the initial diagnosis of the first actuator 70, for detecting abnormality not detectable without energizing the first actuator 70.

Figure 3:
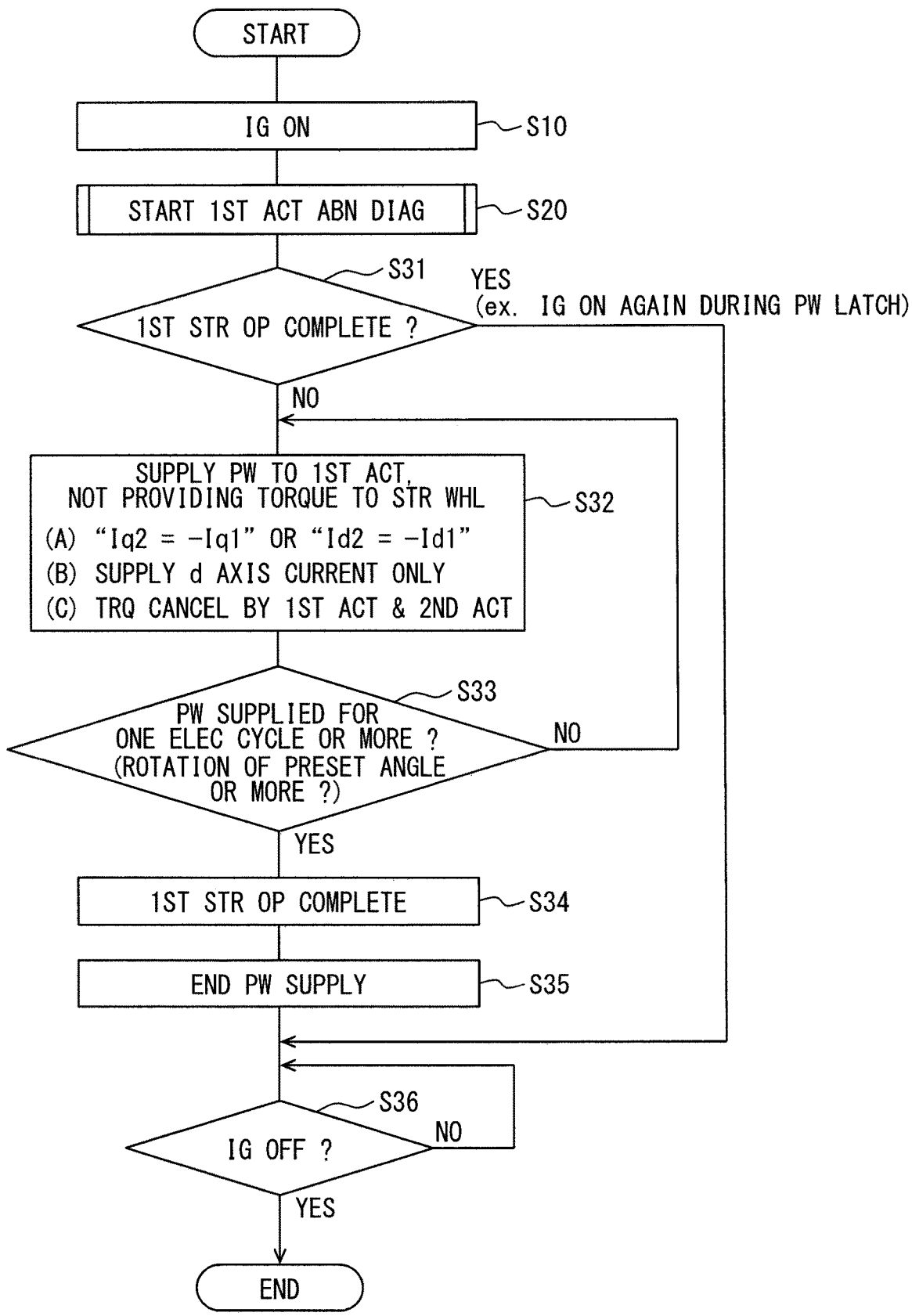
FIG. 3 is a flowchart of a startup process.

Next, a method for performing an initial diagnosis of the first actuator 70 according to the present embodiment is described with reference to flowcharts of FIGS. 3 and 4 and also with reference to FIGS. 5A, 5B and 6. In the following flowchart, symbol S represents "step." At S10 of FIG. 3, an ignition (i.e., "IG" in the drawing) switch is turned ON. In case of a hybrid vehicle, it may be a power switch is ready-ON. At S20, abnormality diagnosis of the first actuator 70 is started.

At S31, it is determined whether or not a first steering operation is complete. When the power supply relay is turned OFF (that is, power supply is switched OFF) after the ignition switch is turned ON and the microcomputer is reset, the subsequent operation of the steering wheel 91 is considered as the first steering operation, thereby NO is determined at S31 and the process proceeds to S32. When the ignition switch is turned ON again during a power latch, it is considered that a first steering operation complete state is continuing, thereby YES is determined at S31 and the process proceeds to S36.

At S32, the first ECU 27 energizes the first actuator 70 so as not to apply any torque to the steering wheel 91, that is, to prevent the steering wheel 91 from rotating unintentionally, i.e., against the driver's intention. Specifically, the following method can be performed as a method of not supplying electric power for applying a torque to the steering wheel 91.

(A) The first ECU 27 supplies electric currents that respectively generate "torques of the same absolute value with opposite rotation direction, i.e., with opposite polarities" to the two sets of windings 701, 702 for a predetermined period of time. For example, as shown in FIG. 5A, the q axis current Iq1 is supplied to the first-system winding 701 and the q axis current Iq2 is supplied to the second-system winding 702 for realizing a relationship of the two currents "Iq2=−Iq1." Alternatively, as shown in FIG. 5B, the d axis current Id1 is supplied to the first-system winding 701 and the d axis current Id2 is supplied to the second-system winding 702 for realizing a relationship of the two currents "Id2=−Id1."

In such a manner, the torques generated in the respective system windings 701, 702 are cancellable with each other, and the output of the first actuator 70 as a whole becomes zero. In particular, when the d axis current only is supplied, a torque is less likely to be generated. In addition, (i) by performing the energization after the initial diagnosis of the angle sensor and (ii) by continuing the abnormality diagnosis of the angle sensor during the energization, a torque generation accompanying the energization for performing the abnormality diagnosis of the angle sensor is prevented even when the angle sensor is abnormal.

(B) The first ECU 27 sets the q axis current to 0 and energizes only the d axis current. Such a method is usable when the first actuator 70 is provided as a single-system motor.

(C) The first ECU 27 and the second ECU 28 operate in cooperation, for causing the first actuator 70 and the second actuator 80 to generate torques of same magnitudes and opposite directions. In such a manner, the torque generated by the first actuator 70 by the energization for performing the initial diagnosis is canceled by the torque of the second actuator 80. Note that, when the second actuator 80 is a hydraulic actuator, it may be difficult to match responsiveness with the first actuator 70 which may be a multi-phase rotating electric machine. That is, in other words, the second actuator 80 may preferably be provided also as a multi-phase rotating electric machine. It should be noted that the above (i.e., a method of (C)) is usable when the first actuator 70 is provided as a single-system motor. In addition, in such a method, abnormality of the torque sensor 94 can be simultaneously diagnosed.

Figure 6:
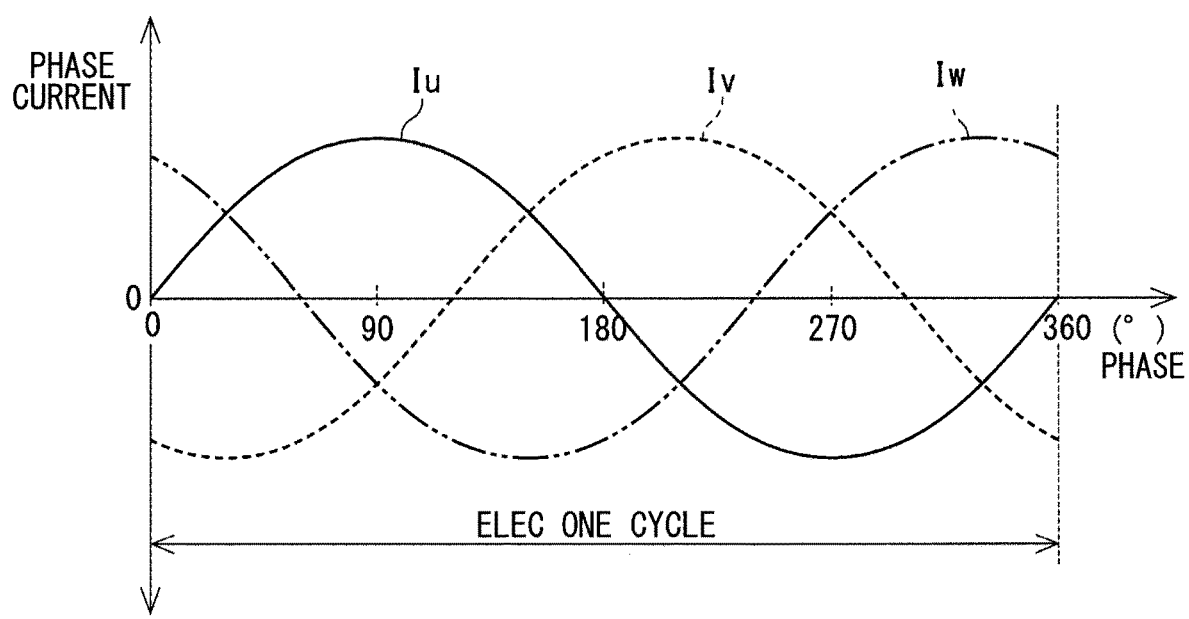
FIG. 6 is a time chart of one cycle of an electric angle.

At S33, it is assumed that the method (A) is adopted, and it is determined whether energization for one cycle of an electric angle or more is complete as a "predetermined period." As shown in FIG. 6, in one cycle of the electric angle, a voltage vector generated by the ON-OFF operation of each of the switching elements 611 to 616, 621 to 626 of an upper arm and a lower arm in each of the three phases is rotated once, changing phases of the U-phase current Iu, the V-phase current Iv, and the W phase current Iw by at least 360°.

When energization is performed by the microcomputer 67 of the first ECU 27, the microcomputer 67 outputs an instruction value for one cycle of the electric angle or more. When the energization is performed according to the steering operation of the driver, it is determined whether or not the steering wheel 91 has rotated by a predetermined angle or more, which corresponds to one cycle of the electric angle of the first actuator 70.

When it is determined as NO at S33, the process returns to a position before S32, and the energization is continued. When it is determined as YES at S33, the first steering operation is complete at S34, and the first ECU 27 ends the energization at S35. When it is determined that the ignition switch has been turned OFF at S36, the process is terminated.

Figure 4:
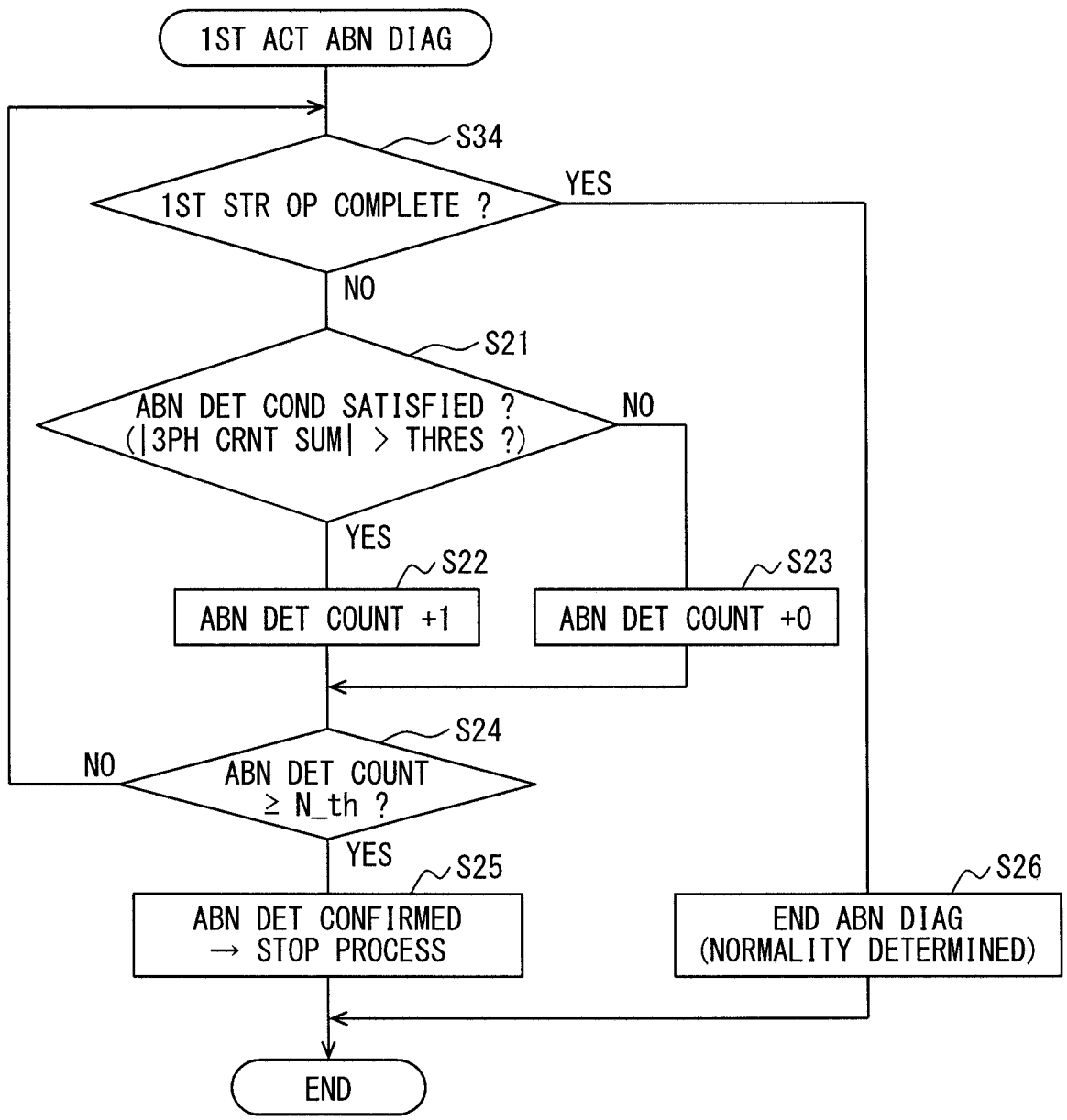
FIG. 4 is a flowchart of a first actuator abnormality diagnosis.
Figure 5A:
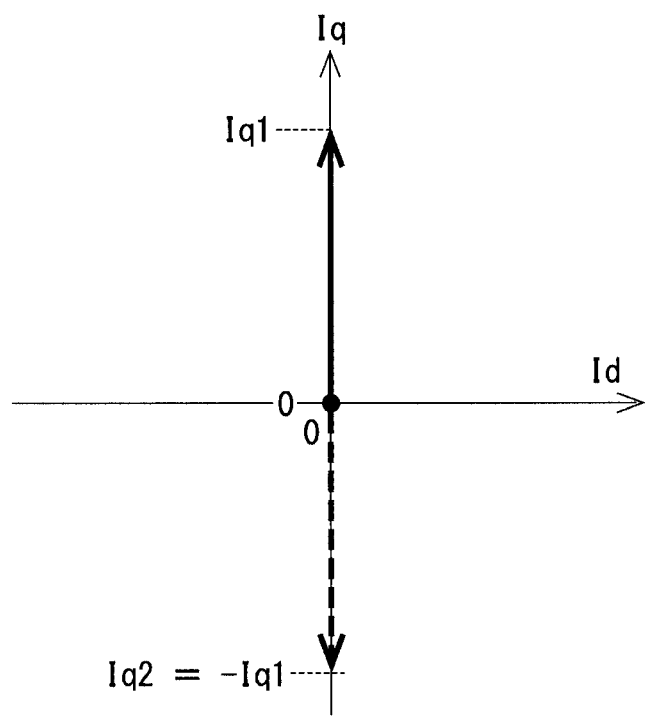
FIGS. 5A and 5B are respectively a dq axis vector diagram of an example of an electric current supplied to two sets of winding.
Figure 5B:
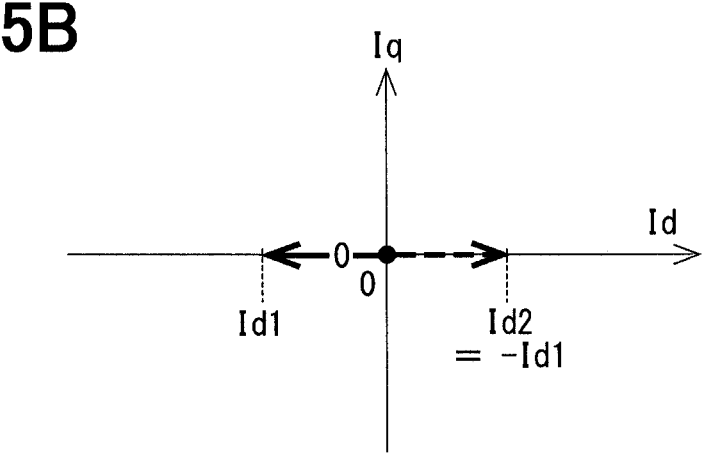

FIG. 4 shows details of the abnormality diagnosis process of the first actuator 70. This routine is repeated until the first steering operation is complete at S34 of FIG. 3. At S21, it is determined whether or not an abnormality determination condition is satisfied based on the detected values of the current, the voltage, etc. at the time of energization. For example, an open-type abnormality or a rotation angle sensor abnormality, in which an electric current deviation becomes excessive, may be determined as abnormal by using an abnormality determination condition of having an absolute value of a sum of three phase currents greater than a threshold (e.g., of 5 [A]) or more.

When YES is determined at S21, an abnormality determination counter is incremented at S22, that is, 1 is added to the counter. When NO is determined at S21, the abnormality determination counter is maintained at S23, that is, 0 is added to the counter. At S24, it is determined whether or not the abnormality determination counter has reached a number threshold Nth (e.g., 50).

When the abnormality determination counter is less than the number threshold N_th, NO is determined at S24, and the process returns to S34. Until the first steering operation is complete in such manner, sampling of the detection value and the abnormality determination are repeated at a predetermined cycle. When the abnormality determination counter reaches the number threshold N_th during such repetition, YES is determined at S24, and the process proceeds to S25. At S25, the abnormality determination is confirmed, and the process shifts to a stop process. On the other hand, if the first steering operation is complete during the abnormality diagnosis, and YES is determined at S34, the abnormality diagnosis is terminated at S26. That is, the first actuator 70 is determined as normal.

Figure 7:
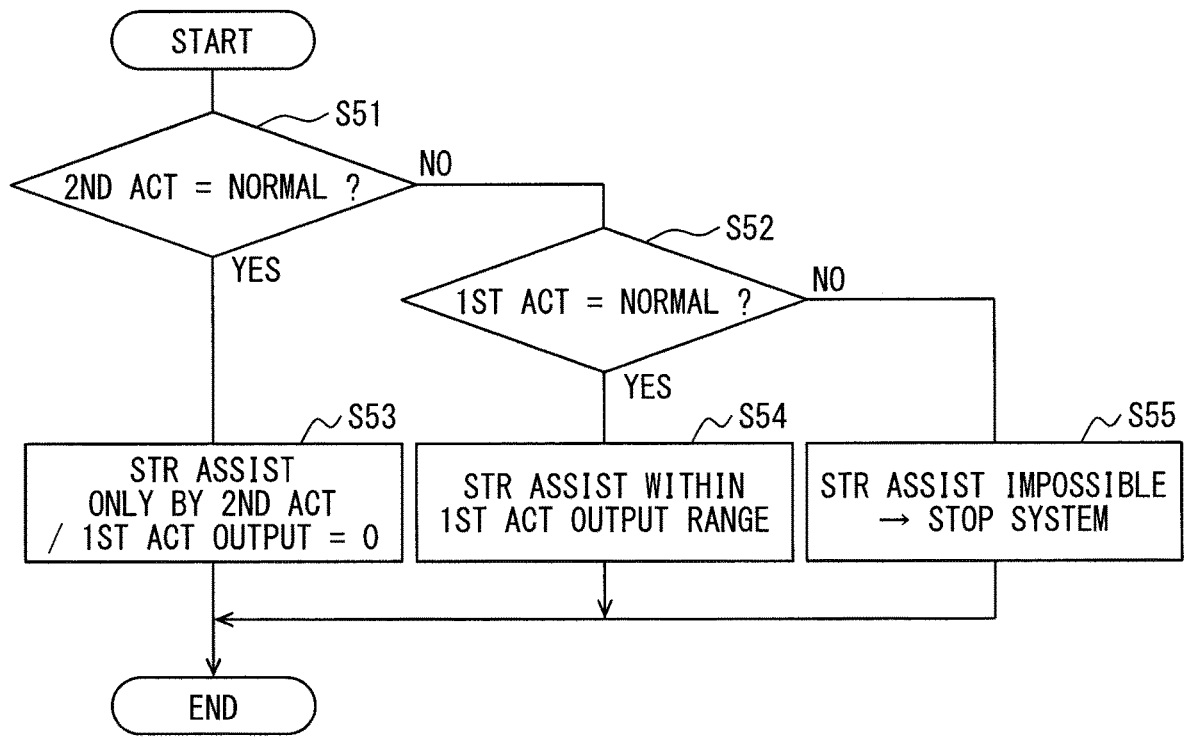
FIG. 7 is a flowchart of switching of an output of a steering assist torque.

Next, with reference to FIG. 7, how the steering assist torque is output from the actuators according to the state (i.e., normal/abnormal) of the first actuator 70 and the second actuator 80 is described. First, when the second actuator 80 is normal, YES is determined at S51. Thereafter, at S53, under the normal operation condition in principle, the second ECU 28 controls only the second actuator 80 to output the steering assist torque. The first ECU 27 controls the output of the first actuator 70 to be equal to zero.

Note that, in a situation where a particularly large steering torque is required, for example, both of the first actuator 70 and the second actuator 80 may be controlled to cooperatively output the steering assist torque as an exception.

If the second actuator 80 is abnormal and NO is determined at S51, it is determined at S52 whether or not the first actuator 70 is normal. When the first actuator 70 is normal, YES is determined at S52, and, at S54, the first ECU 27 causes the first actuator 70 to output the steering assist torque within a first actuator output range, i.e., a torque range that is outputtable from the first actuator 70. When the first actuator 70 is abnormal, NO is determined at S52, and the steering assist is not operational and the system is stopped at S55.

Figure 8:
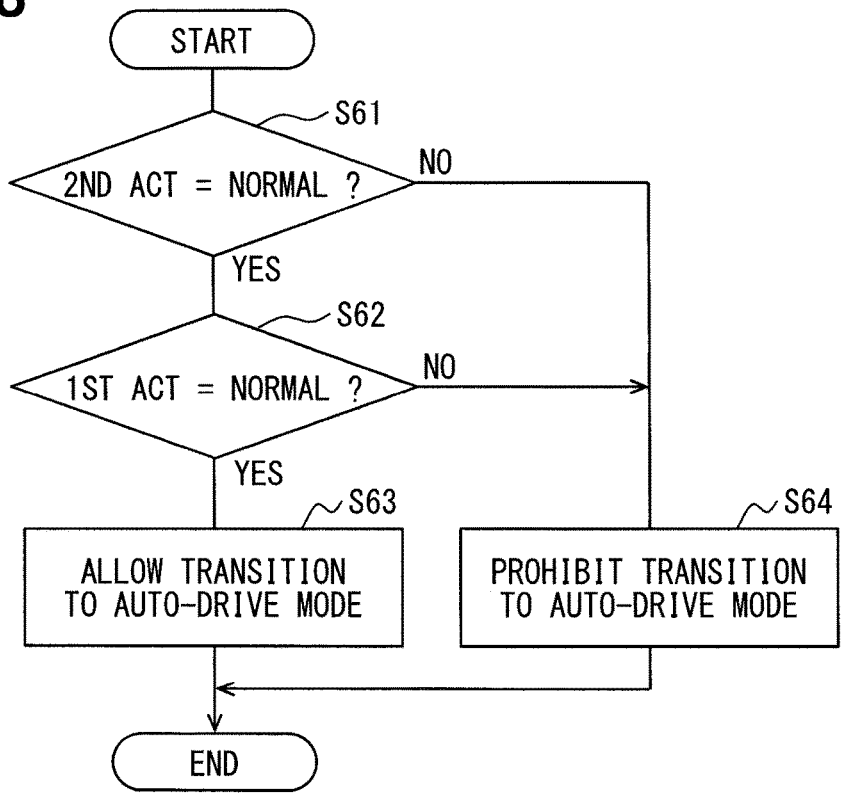
FIG. 8 is a flowchart of determination about whether to transition to an auto-drive mode.

Further, with reference to FIG. 8, how the system transitions to the auto-drive mode (i.e., whether it is alright to transition to the auto-drive) is handled based on the state (i.e., normal/abnormal) of the first actuator 70 and the second actuator 80 is described. When both of the second actuator 80 and the first actuator 70 are normal and YES is determined at both S61 and S62, the vehicle ECU 26 allows the transition to the auto-drive mode at S63. When at least one of the second actuator 80 or the first actuator 70 is abnormal and NO is determined at S61 or S62, the vehicle ECU 26 prohibits the transition to the auto-drive mode at S64.

Effects

As described above, in the power steering apparatus 20 of the present embodiment, at the time of the initial diagnosis, by energizing the first actuator 70 so as not to apply the torque to the steering wheel 91, the initial diagnosis of abnormality that is only determinable with the supply of electric power is performed, without giving an unusual feel to the driver. Therefore, when an abnormality is detected in such a manner without causing an unusual feel to the driver, the appropriate abnormality handling process is promptly performable for the improved reliability of the steering system.

The first actuator 70 of the present embodiment is a multi-phase rotating electric machine having two systems, which is driven by the power supply to the two sets of winding 701, 702. In such configuration, at the time of the initial diagnosis, electric currents that generate positive and negative (i.e., opposite polarity) torques respectively having the same absolute values are supplied to the two sets of winding 701, 702 for a predetermined period, which results in cancellation of the positive and negative torques generated by the windings 701 and 702. Therefore, while the output torque of the second actuator 80 is set to 0, the electric current for abnormality detection can be effectively suppliable to the first actuator 70.

Further, the "predetermined period" for energizing (i.e., supplying the electric current) to generate the equal absolute value torques with opposite signs is set to a period corresponding to one cycle or more of the electric angle of the multi-phase rotating electric machine. By energizing the rotating electric machine for more than one rotation, i.e., for a period in which the voltage vector rotates more than one cycle and each of the phases of the U-phase current Iu, the V-phase current Iv, and the W-phase current Iw changes at least by 360°, all of the switching elements 611 to 616, 621 to 626 as well as wiring of each of the U/V/W phases are thoroughly diagnosable for abnormality detection.

Figure 9:
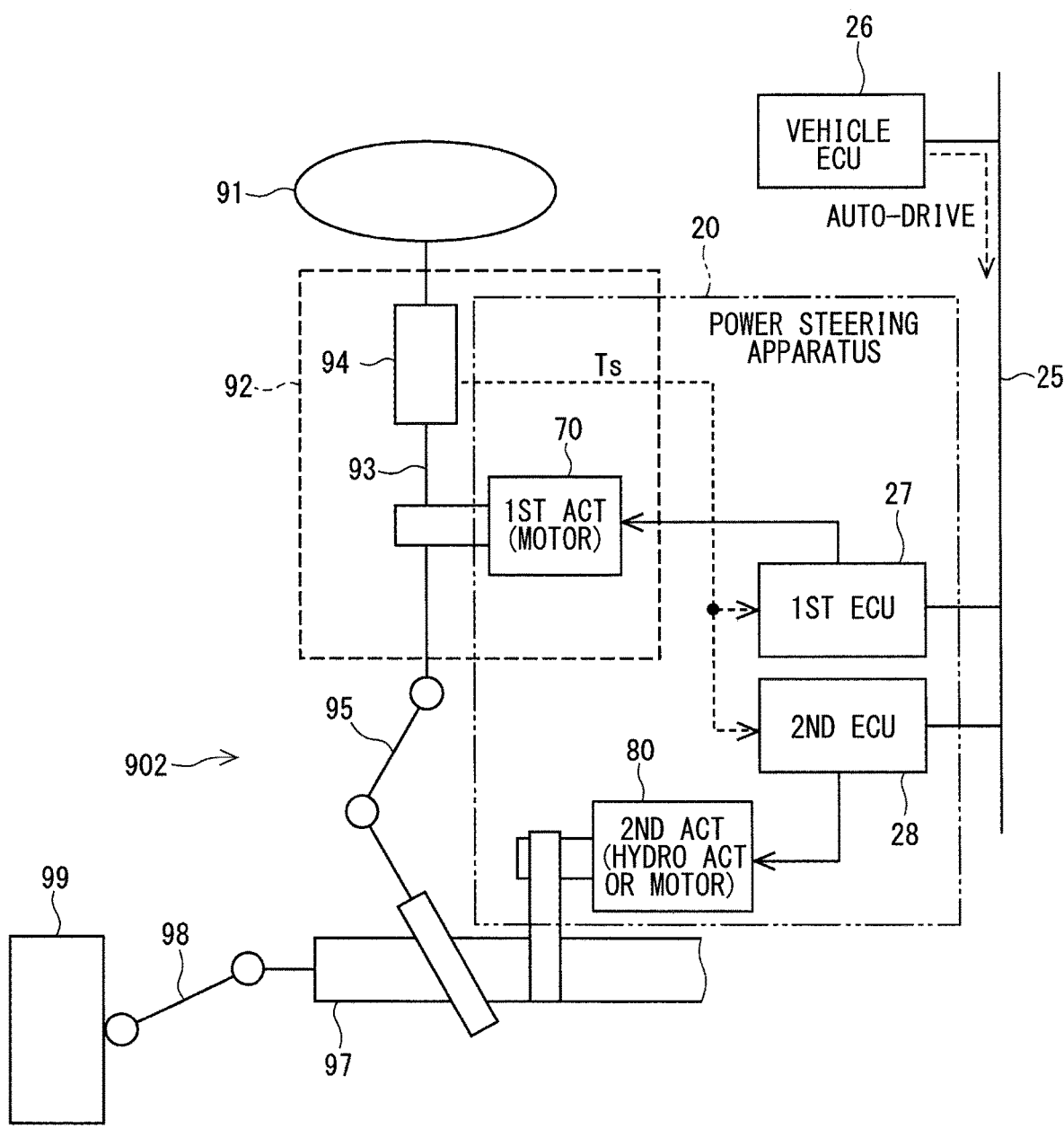
FIG. 9 is a block diagram of another steering system to which the power steering apparatus of the present disclosure is applied.
Figure 10:
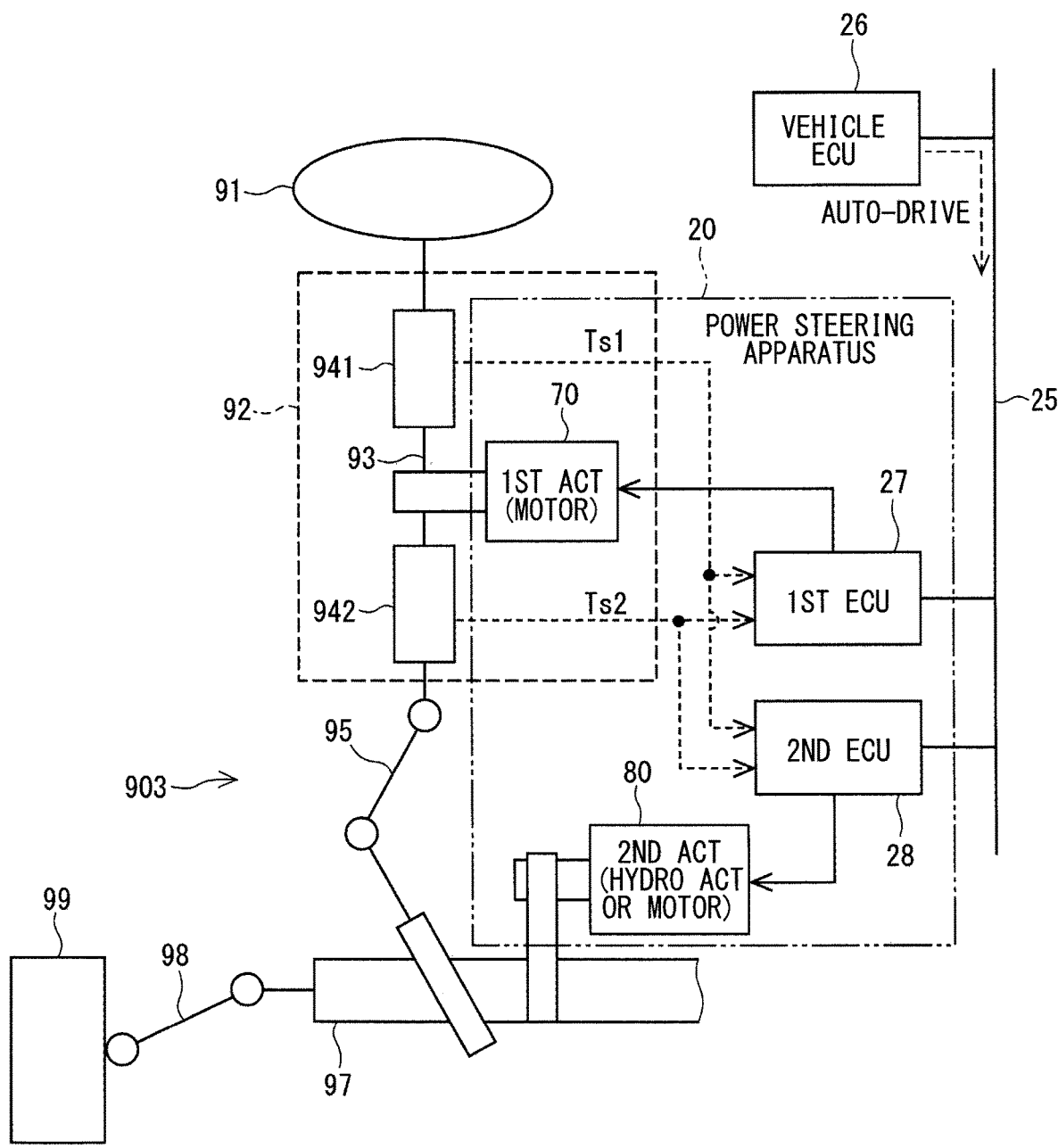
FIG. 10 is a block diagram of yet another steering system to which the power steering apparatus of the present disclosure is applied.

Other Embodiments (A) In the steering system to which the power steering apparatus of the present disclosure is applied, the arrangement of the torque sensor 94 may be configured as shown in FIGS. 9 and 10 in addition to the configuration illustrated in FIG. 1. In a steering system 902 shown in FIG. 9, the torque sensor 94 is positioned closer to the steering wheel 91 than the position where the output of the first actuator 70 is transmitted on the steering shaft 93.

In a steering system 903 shown in FIG. 10, two torque sensors 941, 942 are provided. The first torque sensor 941 is positioned closer to the steering wheel 91 than the position where the output of the first actuator 70 is transmitted on the steering shaft 93. The second torque sensor 942 is positioned closer to the rack gear 97 than the position where the output of the first actuator 70 is transmitted on the steering shaft 93. A steering torque Ts1 detected by the first torque sensor 941 and a steering torque Ts2 detected by the second torque sensor 942 are respectively obtained by the first ECU 27 and the second ECU 28. In a hydraulic actuator configuration with which the second ECU 28 is dispensed, a torsion bar may be applied as a torque sensor.

(B) The power steering apparatus of the present disclosure is not necessarily applied to a vehicle having an auto-drive mode. For example, the first actuator 70 may be provided only for a backup of a time when the second actuator 80 is in an abnormal state.

(C) Processing at the time of abnormality of the first actuator 70 or at the time of abnormality of the second actuator 80 is not limited to the processing (i.e., abnormality handling process) exemplified in the above embodiment. For example, the abnormality handling process may prohibit some of various functions among auto-parking, lane-keeping, following the lead vehicle, obstacle maneuver and the like, while allowing others in a restrictive manner. Alternatively, the process may be classified into categories according to the type of abnormality and/or the abnormal position of the first actuator 70 or the second actuator 80.

(D) In the above embodiment, completion of the first steering operation is determined based on the condition that the rotation of the steering wheel 91 electric angle is equal to or greater than the predetermined angle. However, completion of the first steering operation may be determined based on the flow of the electric currents in each of the phases that are greater than the predetermined value with positive and negative signs.

(E) When energizing to cancel the torques among the two sets of windings 701, 702 of the first actuator 70 or when energizing to cancel the torques among the two actuators 70, 80, a pseudo angle in the ECU instead of the actual actuator angle may be changed for the supply of electric current to each phase. In such a case, the determination of the completion of the first steering operation may simply be based on the pseudo angle, or may be based on the "lapse of a predetermined time or more" while changing the pseudo angle by the predetermined change rate. When changing the pseudo angle at the predetermined change rate, the energization for the initial diagnosis is enabled (i.e., complete) within a predetermined time. Further, calculating the energization instruction value using the pseudo angle by the ECUs 27 and 28 corresponds to calculating an instruction value at least for a period of one cycle of electric angle of the multi-phase rotating electrical machine.

The present disclosure is not limited to the embodiments described above, and may be implemented with various modifications without departing from the spirit of the present disclosure.

What is claimed is:

1. A power steering apparatus providing a total steering assist torque in a steering system that transmits a steering torque of a steering wheel from a steering shaft in a steering column, via an intermediate shaft and a rack gear, to a tire, the power steering apparatus comprising:
   a first actuator including a multi-phase rotating electric machine, disposed on a steering column side of the intermediate shaft, and outputting a first steering assist torque;
   a second actuator disposed on a rack gear side of the intermediate shaft, and outputting a second steering assist torque;
   a first controller controlling a drive of the first actuator and detecting an abnormality of the first actuator; and
   a communication bus having a connection to the first controller, wherein
   the first controller changes an output of the first actuator based on a notification from the communication bus, and
   the first controller performs an initial diagnosis of the first actuator at a vehicle startup time by supplying electric power to the first actuator in a manner that provides at least one of a first diagnosis test and a second diagnosis test,
   wherein the first diagnosis test generates:
      (i) a nonzero first winding torque in a first set of windings in the first actuator, and
      (ii) a nonzero second winding torque in a second set of windings in the first actuator, such that the nonzero first winding torque and the nonzero second winding torque respectively have a positive value and a negative value, which have a same absolute value and are opposite in polarity, and such that the nonzero first winding torque plus the nonzero second winding torque equals zero, and
   wherein the second diagnosis test generates:
      (i) a nonzero first steering assist torque, and
      (ii) a nonzero second steering assist torque, such that the nonzero first steering assist torque and the nonzero second steering assist torque respectively have a positive value and a negative value, which have a same absolute value and are opposite in polarity, and such that the nonzero first steering assist torque plus the nonzero second steering assist torque equals zero.

2. The power steering apparatus of claim 1, wherein the first actuator is a two-system multi-phase rotating electric machine driven by the electric power supplied to two sets of winding, and
   the first controller supplies the electric power to the two sets of winding for a preset period in the initial diagnosis of the first actuator, respectively as an electric current for generating a torque of same absolute value with opposite polarity.

3. The power steering apparatus of claim 2, wherein the first controller supplies the electric power in the initial diagnosis at least for the preset period that corresponds to one cycle of electric angle of the multi-phase rotating electric machine.

4. The power steering apparatus of claim 3, wherein the first controller calculates an instruction value at least for a period of one cycle of electric angle of the multi-phase rotating electric machine.

5. The power steering apparatus of claim 3, wherein the first controller supplies the electric power for rotating the steering wheel at least by an angle that corresponds to one cycle of electric angle of the multi-phase rotating electric machine according to a steering operation of a driver.

6. The power steering apparatus of claim 1, wherein the first controller supplies a d axis electric current as the electric power with zeroing of a q axis electric current in the initial diagnosis.

7. The power steering apparatus of claim 1, wherein the first controller supplies the electric power for the initial diagnosis such that a torque generated by the first actuator with a supply of the electric power for performing the initial diagnosis is cancelled by a torque of the second actuator.

8. The power steering apparatus of claim 1 further comprising:
a second controller for controlling a drive of the second actuator and for detecting an abnormality of the second actuator, wherein
when the second actuator is normally operating, the second actuator outputs the steering assist torque and the output of the first actuator is controlled to be equal to zero, and
when the first actuator is normally operating while an abnormality of the second actuator is being detected, the first controller controls the first actuator to output the steering assist torque within an outputtable torque range of the first actuator.

9. The power steering apparatus of claim 1, wherein the power steering apparatus is disposed in an auto-drive vehicle having an auto-drive function, and
the first actuator and the second actuator cooperatively output the steering assist torque upon having a steering instruction in an auto-drive mode from a vehicle controller.

10. The power steering apparatus of claim 9, wherein when the abnormality of the first actuator is notified from the first controller, the vehicle controller prohibits transition to the auto-drive mode.

11. The power steering apparatus of claim 9 further comprising:
a second controller for controlling a drive of the second actuator and for detecting abnormality of the second actuator, wherein
when the abnormality of the second actuator is notified from the second controller, the vehicle controller prohibits transition to the auto-drive mode.

12. The power steering apparatus of claim 1, wherein the second actuator is a hydraulic actuator.

13. The power steering apparatus of claim 1, wherein the second actuator is a multi-phase rotating electric machine.

14. The power steering apparatus of claim 1,
wherein the first diagnosis test generates:
the nonzero first winding torque and the nonzero second winding torque to cancel each other, and
wherein the second diagnosis test generates:
the nonzero first steering assist torque and the nonzero second steering assist torque cancel each other.

15. A method of providing a total steering assist torque in a steering system comprising:
transmitting a steering torque of a steering wheel from a steering shaft in a steering column, via an intermediate shaft and a rack gear, to a tire;
outputting a first steering assist torque using a first actuator and a second steering assist torque using a second actuator;
controlling a drive of the first actuator and detecting abnormality of the first actuator;
changing the output of the first actuator based on a notification from a communication bus; and
performing an initial diagnosis of the first actuator at a vehicle startup time by supplying electric power to the first actuator in a manner that provides at least one of a first diagnosis test and a second diagnosis test,
wherein the first diagnosis test generates:
(i) a nonzero first winding torque in a first set of windings in the first actuator, and
(ii) a nonzero second winding torque in a second set of windings in the first actuator, such that the nonzero first winding torque and the nonzero second winding torque respectively have a positive value and a negative value, which have a same absolute value and are opposite in polarity, and such that the nonzero first winding torque plus the nonzero second winding torque equals zero, and
wherein the second diagnosis test generates:
(i) a nonzero first steering assist torque, and
(ii) a nonzero second steering assist torque, such that the nonzero first steering assist torque and the nonzero second steering assist torque respectively have a positive value and a negative value, which have a same absolute value and are opposite in polarity, and such that the nonzero first steering assist torque plus the nonzero second steering assist torque equals zero.

16. The method of claim 15,
wherein the first diagnosis test generates:
the nonzero first winding torque and the nonzero second winding torque to cancel each other, and
wherein the second diagnosis test generates:
the nonzero first steering assist torque and the nonzero second steering assist torque cancel each other.

17. A power steering apparatus providing a total steering assist torque in a steering system that transmits a steering torque of a steering wheel from a steering shaft in a steering column, via an intermediate shaft and a rack gear, to a tire, the power steering apparatus comprising:
a first actuator including a multi-phase rotating electric machine, disposed on a steering column side of the intermediate shaft, and outputting a first steering assist torque;
a second actuator disposed on a rack gear side of the intermediate shaft, and outputting a second steering assist torque;
a controller controlling a drive of the first actuator and detecting abnormality of the first actuator; and
a communication bus having a connection to the controller, wherein
the controller changes an output of the first actuator based on a notification from the communication bus,
the controller performs an initial diagnosis of the first actuator at a vehicle startup time by supplying electric power to the first actuator in a manner that provides no steering torque to the steering wheel, and
the controller supplies the electric power for the initial diagnosis such that a torque generated by the first actuator with a supply of the electric power for performing the initial diagnosis is cancelled by a torque of the second actuator.

* * * * *